United States Patent [19]

Wohlhaupter et al.

[11] 4,328,722
[45] May 11, 1982

[54] APPARATUS FOR FACING AND INTERNAL TURNING

[75] Inventors: Gerhard Wohlhaupter, Frickenhausen; Harold Gähr, Unterensingen, both of Fed. Rep. of Germany

[73] Assignee: Emil Wohlhaupter & Co., Frickenhausen, Fed. Rep. of Germany

[21] Appl. No.: 182,578

[22] Filed: Aug. 29, 1980

[30] Foreign Application Priority Data

Oct. 9, 1979 [DE] Fed. Rep. of Germany ....... 2940827

[51] Int. Cl.³ .......................... B23B 3/00; B23B 41/06
[52] U.S. Cl. ..........,.............................. 82/2 E; 82/1.4
[58] Field of Search .............................. 82/2 E, 1.2, 1.4

[56] References Cited

U.S. PATENT DOCUMENTS 1,994,879  3/1935  Tweit ..................................... 82/2 E
2,486,977  11/1949  Peters .................................... 82/2 E

FOREIGN PATENT DOCUMENTS 1652658  3/1979  Fed. Rep. of Germany ........ 82/2 E

Primary Examiner—Harrison L. Hinson
Attorney, Agent, or Firm—Shenier & O'Connor

[57] ABSTRACT

Apparatus for facing and internal turning includes a rotatable shaft and a turning head fixed for rotation with the shaft. A tool carriage for carrying a cutting tool is displaceable on the turning head transversely to the axis of rotation thereof. The transverse displacement of the carriage is effected by way of two planetary gear units lying in planes at right angles to the axis of rotation of the shaft. The sun gear of the first unit is fixed for rotation with the shaft, whilst the sun gear of the second unit, which acts as a driving gear for the tool carriage, is rotatable relative to the shaft. A further ring gear is disposed coaxially with said gear units and engages a gear connected for rotation with the planet gear of the second unit. Fastening means selectively lock said further ring gear against rotation whereby the sun gear of the second unit is rotated relative to the shaft and effects transverse displacement of the tool carriage.

5 Claims, 7 Drawing Figures

APPARATUS FOR FACING AND INTERNAL TURNING

BACKGROUND OF THE INVENTION

The invention relates to an apparatus for facing and internal turning comprising a rotationally driven shaft, a turning head fixed for rotation with the shaft, and a tool carriage for carrying a cutting tool displaceable on the turning head transversely to the axis of rotation thereof.

In a known apparatus of this kind (DE-OS No. 16 52 658), transverse displacement of the tool carriage is effected by first and second planetary gear units lying in different planes extending at right angles to the axis of rotation of the shaft, the sun gear of the first planetary gear unit being fixed for rotation with the shaft and the sun gear of the second planetary gear unit being rotatable relative to the shaft and acting as a driving gear for the tool carriage. The two planetary gear units are selectively coupled to one another by one of a plurality of worm gear trains having different transmission ratios, so that depending on the worm gear train selected the transverse displacement of the tool carriage and of the tool connected to it is effected more or less quickly.

The manufacture of worm gear trains entails considerable labour and expense. In an apparatus of the type in question such gear trains also have the disadvantage of requiring considerable space, so that they have an unfavourable effect on the overall size of the apparatus.

The problem underlying the present invention is that of remedying these shortcomings and indicating simple, space-saving means with the aid of which automatic transverse displacement of the tool carriage can be initiated.

SUMMARY OF THE INVENTION

According to the invention there is provided an apparatus for facing and internal turning, the apparatus comprising a stationary casing, a rotatable driven shaft mounted in said casing, a turning head fixed for rotation with said shaft, a tool carriage for carrying a cutting tool displaceable on the turning head transversely to the axis of rotation thereof, and means for effecting the transverse displacement of the tool carriage, wherein said means for effecting transverse displacement of the tool carriage comprise a first and a second planetary gear unit each mounted in a recess in the casing to lie within a respective plane extending at right angles to the axis of rotation of said shaft, each said planetary gear unit comprising a sun gear, a ring gear and at least one planet gear, wherein the sun gear of the first planetary gear unit is fixed for rotation with the shaft, the sun gear of the second planetary gear unit is rotatable relative to the shaft and acts as a driving gear for the tool carriage, and the ring gear of one of said first and second planetary gear units is rotatable in the casing, said means for effecting the transverse displacement of the tool carriage further comprising selectively operable gear means for imparting a rotational speed to the sun gear of the second planetary gear unit which is different from the rotational speed of the sun gear of the first planetary gear unit, said selectively operable gear means comprising at least one further ring gear disposed in said recess in the casing coaxially with said first and second planetary gear units, said further ring gear being rotatable in the casing and having a different number of teeth from that of the ring gears of said first and second planetary gear units, fastening means arranged to selectively lock said further ring gear to said casing, and an additional gear engaged by said further ring gear and connected for rotation with the planet gear of the second planetary gear unit.

As the or each further ring gear together with its associated additional gear are simple to manufacture and take up little space, it is possible to produce a complete facing and internal turning head of relatively small overall size.

BRIEF DESCRIPTION OF THE DRAWINGS

An embodiment of the present invention will hereinafter be described, by way of example, with reference to the accompanying drawing, in which.

DESCRIPTION OF A PREFERRED EMBODIMENT

Figure 1:
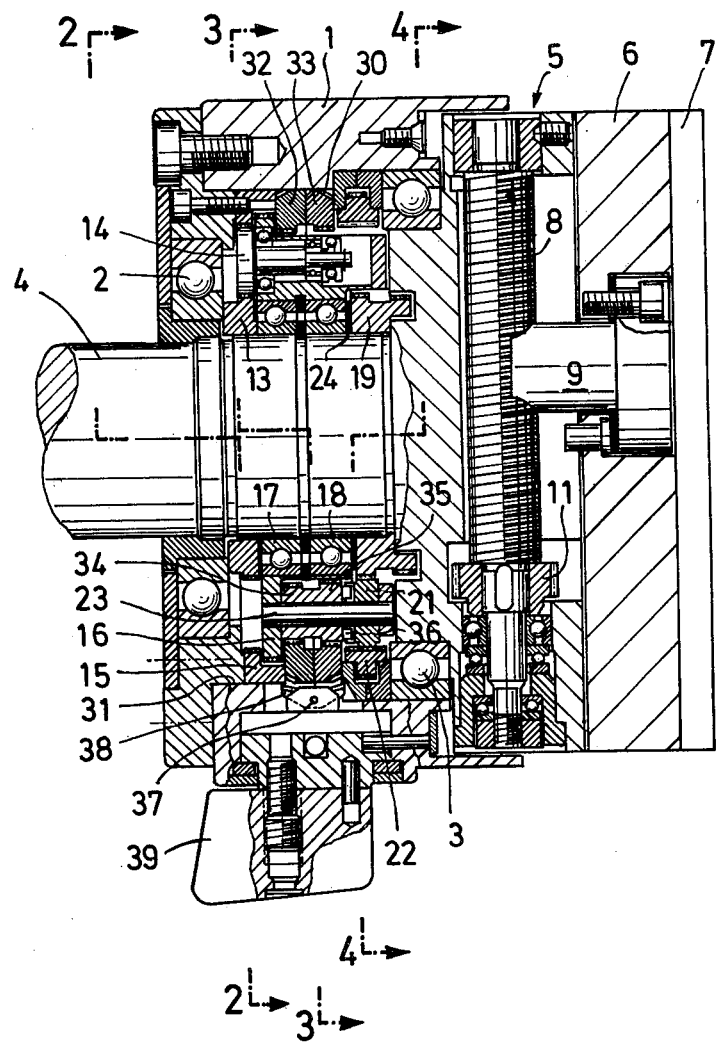
FIG. 1 shows a section of an apparatus for facing and internal turning.

As can be seen in FIG. 1, a cylindrical shaft 4 is mounted for rotation by means of ball bearings 2, 3 in a stationary casing 1. A turning head 5 is fixed to the bottom end of the shaft 4 for rotation therewith, the turning head 5 may be integral with the shaft 4. Drive means (not shown) are provided to rotate the shaft 4. A tool carriage 6 is displaceable transversely to the axis of rotation of the shaft 4 in a slideway, for example a dovetail guide, provided on the underside of the turning head 5. In FIG. 1 the direction of displacement of the carriage 6 lies in the plane of the drawing. The tool carriage 6 has on its underside a guide 7, in which a tool, for example a facing cutter, can be fastened on the carriage 6. A screw spindle 8 is mounted in the turning head 5 and is rotatable about an axis parallel to the direction of displacement of the tool carriage 6. The spindle 8 engages in a half-nut 9 fastened to the carriage 6. The screw spindle 8 is driven, in a manner which is described hereinafter, by means of a worm wheel 11 fastened for rotation with the spindle 8. On rotation of the screw spindle 8 the tool carriage 6 carrying the tool (not shown) is displaced at right angles to the axis of rotation of the shaft 4 in dependence upon the direction of rotation of the spindle 8.

Figure 5:
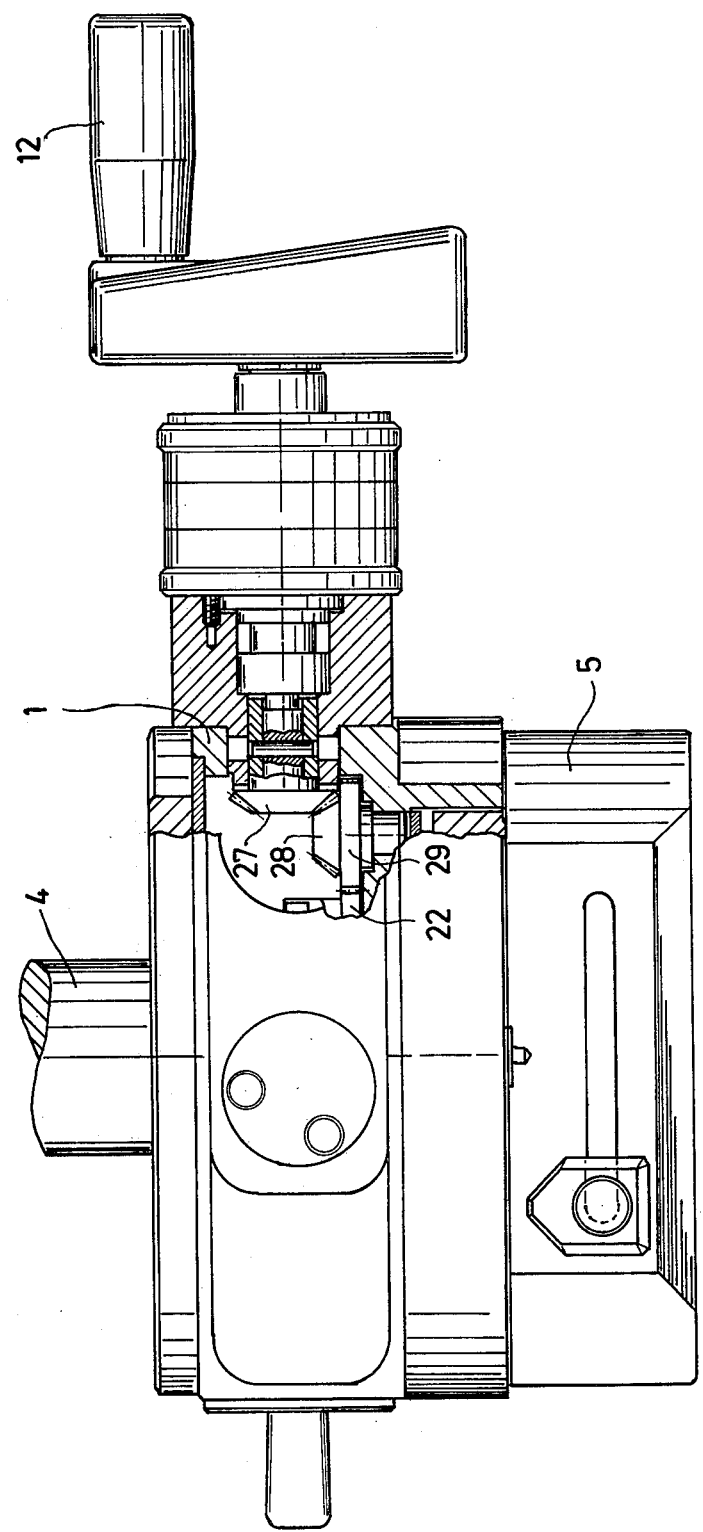
FIG. 5 shows a view, partly in section, of the apparatus taken in the direction of arrow A of FIG. 3.

In the illustrated embodiment of the apparatus for facing and internal turning the transverse displacement of the tool carriage 6 can in known manner be effected either manually or automatically. Manual transverse displacement is effected in conventional manner, while the turning head 5 is stationary, by means of a hand crank 12 (see FIG. 5) which can be coupled to the spindle 8 when required.

The automatic transverse displacement of the tool carriage 6 is derived from the rotary movement of the shaft 4 during the rotation of the apparatus, and both a slow, continuous transverse displacement of the carriage during the operation of the apparatus and a rapid return movement in the opposite direction can be achieved. The present invention relates to the automatic production of the transverse displacement of the tool carriage 6. The return movement can be effected in a manner known per se.

A sun gear 13 of a first planetary gear unit is fastened to the shaft 4 (FIG. 1). The sun gear 13 meshes with at least one planet gear 14, which in turn is engaged with internal toothing on a ring gear 15 fastened to the casing 1. The or each planet gear 14 is mounted for rotation in an annular planet carrier 16 which is rotatable about the shaft 4 by way of ball bearings 17, 18. In a plane lying below the first planetary gear unit consisting of the parts 13, 14, and 15 is disposed a second planetary gear unit which comprises a sun gear 19 rotatable relative to the shaft 4, a planet gear 21 in mesh therewith, and a ring gear 22 in engagement with the planet gear 21 and adapted to rotate in the casing 1. The planet gear 21 (of which, like the planet gear 14, there may be only one or a plurality) rotates on a pin 23 mounted in the planet carrier 16.

The planetary gear units described are disposed coaxially to the shaft 4 in a recess 31 in the casing 1, the latter being held in a fixed position. The ring gear 22, which is rotatable in the casing 1, has external teeth in addition to its internal toothing. The sun gear 19 of the second planetary gear train is rotatable relative to the shaft 4 and is braked, for example by means of a spring ring (cup spring) 24.

When the shaft 4 rotates, the sun gear 13 which is rotationally fixed to the shaft 4, drives the planet gear 14 which rolls in the ring gear 15 fastened to the casing and at the same time turns the planet carrier 16 around the shaft 4. As the second planetary gear train has the same transmission ratios as the first planetary gear train, the planet gear 21 mounted in the rotating carrier 16 rolls in the ring gear 22 and at the same time is in mesh with the sun gear 19. However, because the transmission ratios are the same, the sun gear 19 performs no rotation relative to the shaft 4 and thus no transverse displacement of the tool carriage 6 is effected.

Figure 4:
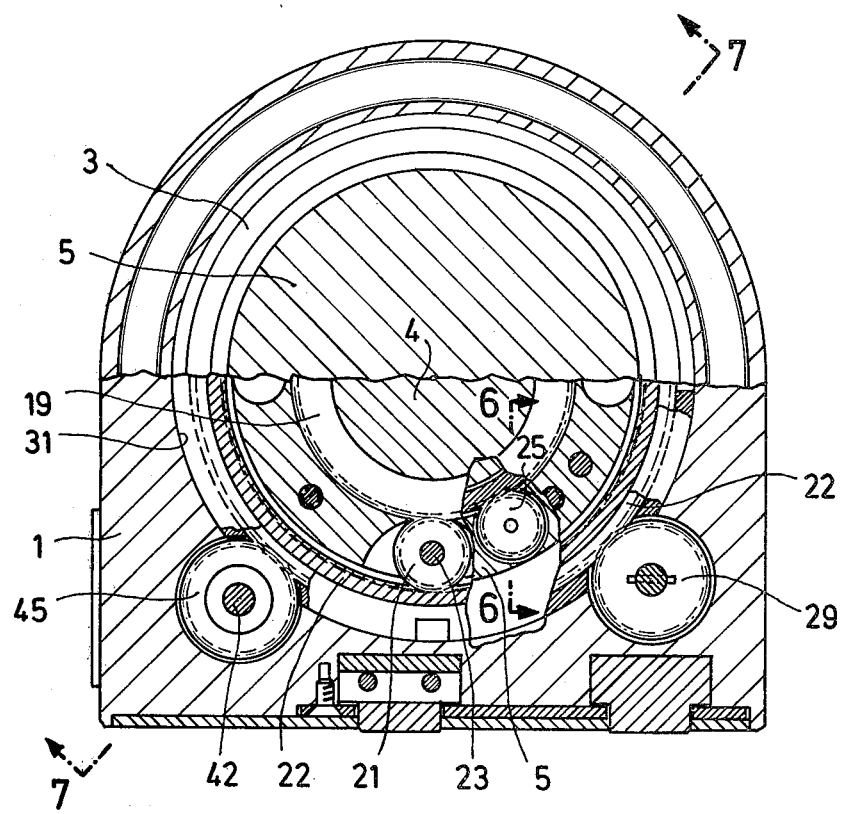
FIG. 4 shows a section of the apparatus taken on the line 4—4 of FIG. 1.
Figure 6:
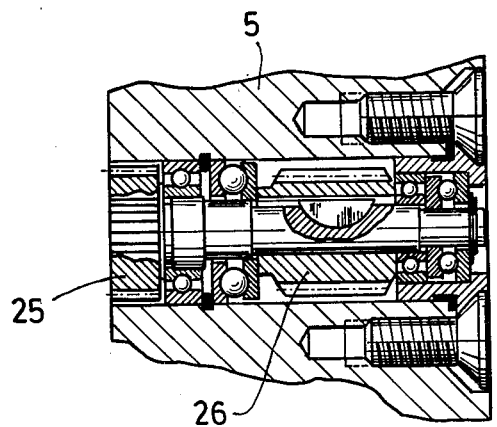
FIG. 6 shows a fragmentary sectional view taken on the line 6—6 of FIG. 4.

The sun gear 19 of the second planetary gear train acts as a drive gear for the screw spindle 8 and thus also for the transversely displaceable tool carriage 6. For this purpose (see FIG. 4), the sun gear 19 meshes with a gear 25 which is mounted for rotation in turning head 5 and which in turn is fixed for rotation with a worm 26 (see FIG. 6). The worm 26 is in turn connected to the previously mentioned worm wheel 11 (FIG. 1), which serves to drive the screw spindle 8. To rotate the screw spindle 8 and hence to displace the tool carriage 6 transversely it is necessary to impart to the sun gear 19 a rotation relative to the shaft 4. In the manual displacement of the carriage 6 (see FIG. 5) a gear 29 is turned by way of the hand crank 12 and two intermeshing bevel gears 27, 28, the bevel gear 28 being connected to the gear 29. The gear 29 meshes with the ring gear 22 of the second planetary gear train. On operation of the hand crank 12 the ring gear 22 is thus rotated, and this rotation is imparted to the sun gear 19 by way of the planet gear 21. The sun gear 19 then drives the screw spindle 8 and consequently the tool carriage 6 by way of the gear 25, the worm 26 and the worm wheel 11. This manual transverse displacement of the carriage 6 can be effected while the apparatus is stationary or rotating.

For the continuous displacement of the tool carriage 6 during the rotation of the shaft 4 and turning head 5 the following means are provided; in the recess 31 in the casing 1, which receives the first and second planetary gear trains, two additional ring gears 32, 33 are disposed coaxially with these gear trains so as to be rotatable relative to the casing. In the embodiment illustrated these two ring gears 32, 33 lie between the first and second planetary gear trains consisting of the parts 13, 14, 15 and 19, 21, 22 respectively. The ring gears 32, 33 mesh with gears 34 and 35 respectively, which are joined integrally to form a block. This block is rotatable on the pin 23 and by means of a tongue and groove connection 36 is rotationally fixed to the planet gear 21. The two ring gears 32, 33 have a different number of teeth compared with the ring gears 15, 22 of the two planetary gear trains. This can be achieved by using the same tooth pitch and making the internal radii of the ring gears 32, 33 different from those of the ring gears 15, 22, or by using different tooth pitches with the same internal radius in each case. The ring gears 32, 33 thus provide different transmission ratios from those of the ring gears 15, 22. Furthermore, as indicated in FIG. 1, the transmission ratios between the ring gear 32 and gear 34, on the one hand, and the ring gear 33 and gear 35, on the other, are different.

Figure 3:
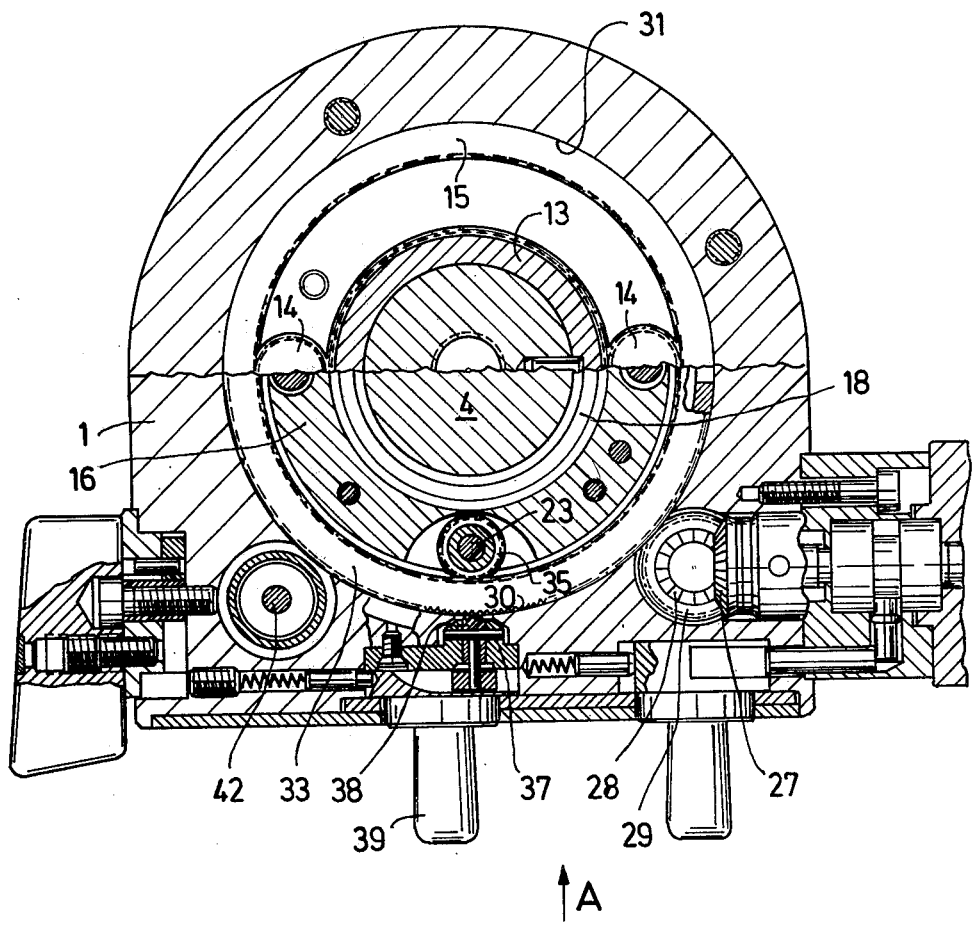
FIG. 3 shows a section of the apparatus taken on the line 3—3 of FIG. 1.

A detent plate 38 is pivotally mounted on a pin 37 in the casing 1, the pin 37 being fastened to the casing (see FIGS. 1 and 3). The outer periphery of the ring gears 32, 33 and the side of the detent plate 38 facing these ring gears are provided with corresponding toothings 30 (see in particular FIG. 3). The detent plate 38 can be pivoted by means of a control element 39 provided on the casing 1 from a neutral position, in which the plate is not in mesh with either of the ring gears 32, 33, into a position in which it is in mesh selectively either with the ring gear 32 or with the ring gear 33. In this way the detent plate 38 serves as fastening means and selectively effects the fastening or locking of one of the ring gear 32, 33 to the casing 1. As soon as one of the ring gears 32, 33 has been fastened to the casing 1, the normally stationary ring gear 22 is constrained to turn because of the previously mentioned different transmission ratios. Consequently the sun gear 19 is turned relative to the shaft 4, so that in the manner previously described the turning of the screw spindle 8 and thus the transverse displacement of the tool carriage 6 are initiated. The transverse displacement of the carriage 6 continues as long as the detent plate 38 is engaged with a respective one of the ring gears 32, 33.

Between the control element 39 and the detent plate 38 it is possible to provide, in a manner not illustrated, spring means which press the detent plate into the toothing 30 of the corresponding ring gear 32 or 33 when the control element 39 is in the appropriate position. If the tool carriage 6 should be subjected to overloading during its transverse movement, so that further displacement encounters resistance, the initial stress of these spring means is overcome and the detent plate 38 is automatically disengaged from the toothing 30 and damage to or destruction of the apparatus is prevented.

In the embodiment illustrated two ring gears 32 and 33 are provided such that the transverse displacement of the tool carriage 6 may be effected at one of two different speeds. In principle, for the initiation of the transverse displacement of the tool carriage 6 a single ring gear 32 or 33 is sufficient. If three of more feed speeds are desired for the tool carriage 6, three or more ring gears corresponding to the ring gears 32, 33 adapted to be locked by corresponding fastening means may be disposed in the casing 1.

Figure 2:
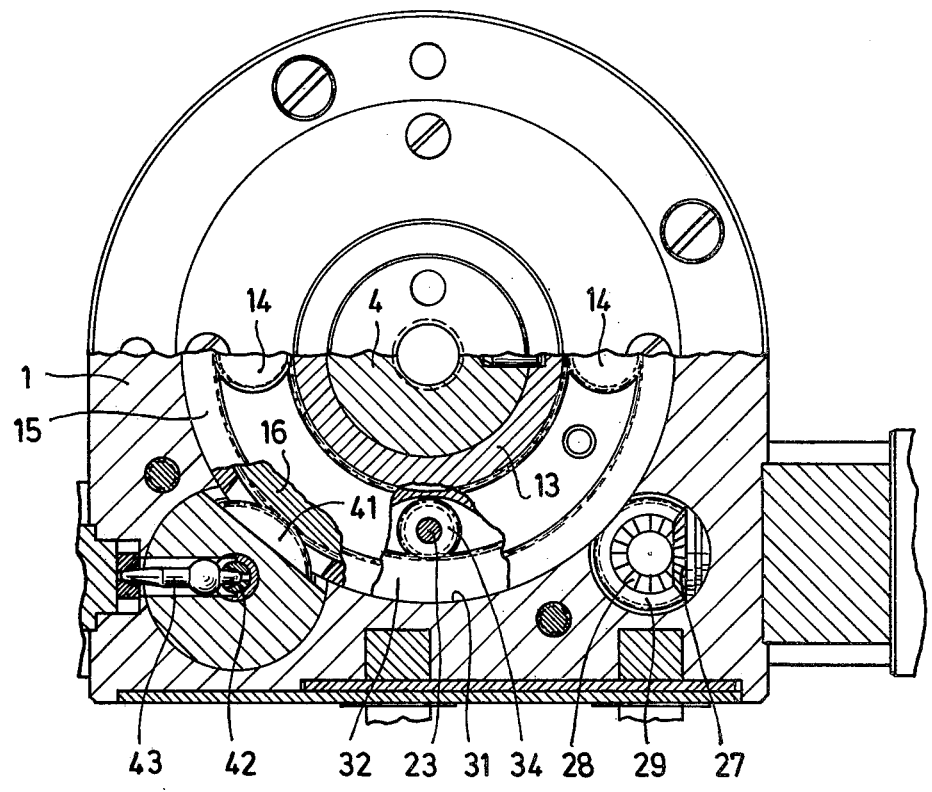
FIG. 2 shows a section of the apparatus taken on the line 2—2 of FIG. 1.
Figure 7:
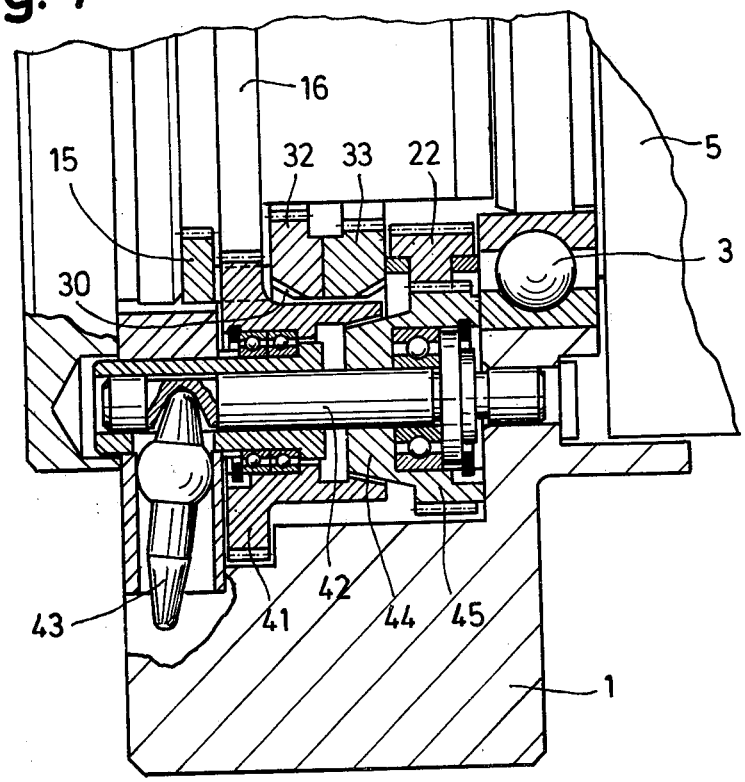
FIG. 7 shows a fragmentary sectional view taken on the line 7—7 of FIG. 4.

As in any apparatus for facing and internal turning, in the apparatus described and illustrated here means are also provided for the high speed return of the tool carriage 6. These means will be briefly explained with the aid of FIGS. 2 and 7. The planet carrier 16 (see also FIG. 1) has external toothing with which a gear 41 mounted for rotation in the casing 1 engages. The gear 41 is carried by a pin 42, and both the pin 42 and the gear 41 are axially displaceable. For the displacement of the pin 42 use is made of a small lever 43 pivotally mounted in the casing 1. With the lever 43 and consequently also the pin 42 in the appropriate position, the gear 41 is frictionally coupled to the conical extension 44 of another gear 45, which in turn meshes with the external toothing of the ring gear 22 of the second planetary gear train. If therefore during the rotation of the shaft 4 and thus of the planet carrier 16 the lever 43 effects the coupling of the gears 41 and 45, the ring gear 22 is driven at high speed and by way of the planet gear 21, the sun gear 19 and the worm drive (parts 11, 26) acts on the screw spindle 8 to bring about the rapid return movement of the tool carriage 6 in the opposite direction to the normal working stroke, directed radially outwards, of the tool carriage. The two gears 41, 45 can normally be held out of engagement by spring means in the conventional manner.

Finally, it will be observed that the additional gear means provided between the two planetary gear trains, that is to say at least one ring gear 32 or 33 and an associated gear 34, 35, act in such a manner that on the locking of the ring gear by the detent plate 38 the speed of rotation of the planet gear is altered by constraint. The ring gear 22 rotatably mounted in the casing 1 thus starts to rotate in accordance with the respective transmission ratio. Finally, the planet gear 21 drives the sun gear 19 of the second planetary gear train and thus also the tool carriage 6. As long as neither of the two additional ring gears 32, 33 is locked to the casing 1, they rotate at different speeds relative to the gears 34, 35 because of the different transmission ratios, while the ring gear 22 of the second planetary gear train is stationary.

As indicated, the additional overall height of the apparatus entailed by the automatic transverse displacement of the tool carriage 6 results solely from the thickness of the additional ring gears 32, 33. This thickness can be kept substantially smaller than the space required for worm drives, so that the overall height of the apparatus of the invention is reduced.

We claim:

1. An apparatus for facing and internal turning, the apparatus comprising a stationary casing, a rotatable driven shaft mounted in said casing, a turning head fixed for rotation with said shaft, a tool carriage for carrying a cutting tool displaceable on the turning head transversely to the axis of rotation thereof, and means for effecting the transverse displacement of the tool carriage, wherein said means for effecting transverse displacement of the tool carriage comprise a first and a second planetary gear unit each mounted in a recess in the casing to lie within a respective plane extending at right angles to the axis of rotation of said shaft, each said planetary gear unit comprising a sun gear, a ring gear and at least one planet gear, wherein the sun gear of the first planetary gear unit is fixed for rotation with the shaft, the sun gear of the second planetary gear unit is rotatable relative to the shaft and acts as a driving gear for the tool carriage, and the ring gear of one of said first and second planetary gear units is rotatable in the casing, said means for effecting the transverse displacement of the tool carriage further comprising selectively operable gear means for imparting a rotational speed to the sun gear of the second planetary gear unit which is different from the rotational speed of the sun gear of the first planetary gear unit, said selectively operable gear means comprising at least one further ring gear disposed in said recess in the casing coaxially with said first and second planetary gear units, said further ring gear being rotatable in the casing and having a different number of teeth from that of the ring gears of said first and second planetary gear units, fastening means arranged to selectively lock said further ring gear to said casing, and an additional gear engaged by said further ring gear and connected for rotation with the planet gear of the second planetary gear unit.

2. An apparatus according to claim 1, wherein said further ring gear and said additional gear is disposed between said first and second planetary gear units.

3. An apparatus according to claim 1, wherein two said further ring gears are provided and each is engaged with an associated additional gear, and wherein said further ring gears and said additional gears are disposed between said first and second planetary gear units.

4. An apparatus according to claim 1, wherein said fastening means for the further ring gear comprises a detent plate which is pivotally mounted in the casing and which is arranged to engage in toothing provided on the outer periphery of the further ring gear.

5. An apparatus according to claim 4, wherein said detent plate is prestressed by spring means such that if the tool carriage is overloaded the detent plate is disengaged from the toothing of the ring gear.

* * * * *